(12) United States Patent
Reynolds et al.

(10) Patent No.: US 12,326,699 B2
(45) Date of Patent: Jun. 10, 2025

(54) DATA SCIENTIST VIEWS IN INTEGRATED DESIGN ENVIRONMENTS

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 382 days.

(21) Appl. No.: 17/851,628

(22) Filed: Jun. 28, 2022

(65) Prior Publication Data
US 2023/0418243 A1 Dec. 28, 2023

(51) Int. Cl.
*G06F 9/451* (2018.01)
*G05B 13/02* (2006.01)
(Continued)

(52) U.S. Cl.
CPC ............ *G05B 13/0265* (2013.01); *G06F 8/34* (2013.01); *G06F 8/35* (2013.01); *G06F 9/44* (2013.01); *G05B 13/027* (2013.01)

(58) Field of Classification Search
CPC ..... G05B 13/0265; G05B 13/027; G06F 8/34; G06F 8/35; G06F 9/44; G06B 19/4155;
(Continued)

(56) References Cited

U.S. PATENT DOCUMENTS

| 6,947,798 B2 | 9/2005 | Bronikowski et al. |
| 10,216,177 B2 | 2/2019 | Gildert et al. |

(Continued)

FOREIGN PATENT DOCUMENTS

| EP | 1816531 A2 | 8/2007 |
| EP | 3926423 A1 | 12/2021 |
| WO | 2021051031 A1 | 3/2021 |

OTHER PUBLICATIONS

W. Bolton, Programmable Logic Controllers, 2015, [Retrieved on 2024-12-20]. Retrieved from the internet: < URL: https://d1wqtxts1xzle7.cloudfront.net/97293880/William_Bolton_Programmable_Logic_Controllers_Sixth_Edition_Newnes_2015_-libre.pdf?> 412 Pages (1-412) (Year: 2015).*

(Continued)

*Primary Examiner* — Anibal Rivera

(57) ABSTRACT

Various embodiments of the present technology generally relate to industrial automation environments. More specifically, embodiments include systems and methods to surface machine learning systems in a design application of an industrial automation environment. In some examples, a design component generates a control program configured for implementation by a Programmable Logic Controller (PLC). The design component receives a user input that selects a program tag that represents a target variable in an industrial automation process. In response to the user selection, the design component identifies one or more machine learning models associated with the target variable and displays the one or more machine learning models. The design component receives a user input that selects one of the one or more machine learning models and responsively integrates another program tag that represents the selected machine learning model into the control program.

20 Claims, 8 Drawing Sheets

(51) Int. Cl.
    *G05B 13/04*      (2006.01)
    *G06F 8/34*      (2018.01)
    *G06F 8/35*      (2018.01)
    *G06F 9/44*      (2018.01)

(58) Field of Classification Search
CPC ............ G06B 19/0426; G06B 19/4083; G06B 19/41885; G06B 19/41875; G06B 19/42; G06N 3/08; G06N 3/04
See application file for complete search history.

(56) References Cited

U.S. PATENT DOCUMENTS

| | | | |
|---|---|---|---|
| 11,740,624 | B2 | 8/2023 | Ramamurthy et al. |
| 2012/0158623 | A1 | 6/2012 | Bilenko et al. |
| 2019/0102657 | A1 | 4/2019 | Sayyarrodsari et al. |
| 2019/0354093 | A1 | 11/2019 | Nguyen et al. |
| 2020/0103838 | A1* | 4/2020 | Bertinetti ............... G05B 17/02 |
| 2020/0150638 | A1 | 5/2020 | Mourzine et al. |
| 2021/0042638 | A1* | 2/2021 | Novotny ................ G06N 20/00 |
| 2021/0090105 | A1* | 3/2021 | Nordmark ............. G06F 40/216 |
| 2021/0097456 | A1 | 4/2021 | Sayyarrodsari et al. |
| 2021/0389748 | A1 | 12/2021 | Mcadam et al. |
| 2021/0397152 | A1* | 12/2021 | Chen .................. G05B 19/0426 |
| 2022/0292338 | A1 | 9/2022 | Nair et al. |
| 2022/0388160 | A1 | 12/2022 | Yonemoto et al. |
| 2022/0390515 | A1 | 12/2022 | Pickerd et al. |
| 2023/0145448 | A1 | 5/2023 | Huber et al. |
| 2023/0359173 | A1* | 11/2023 | Hildebrandt ....... G05B 19/4155 |

OTHER PUBLICATIONS

Extended European Search Report for EP Application No. 23180015. 2, mailed Nov. 22, 2023; 8 pages.

Non-Final Office Action in U.S. Appl. No. 17/843,122, mailed Jul. 3, 2024, 61 pages.

Notice of Allowance in U.S. Appl. No. 17/826,689, mailed Aug. 6, 2024, 19 pages.

* cited by examiner

DATA SCIENTIST VIEWS IN INTEGRATED DESIGN ENVIRONMENTS

BACKGROUND

Industrial manufacturing environments generate huge quantities of data at very fast speeds making the extraction of enterprise-level insights challenging. In industrial automation environments, control systems are used to drive various operations along an industrial line. Control programs are developed by programmers and comprise a set of program tags to carry out an industrial operation. The program tags comprise chunks of the control code and correspond to industrial assets, devices, and sensors. Control code is used by control systems like Programmable Logic Controllers (PLCs) to drive the industrial assets, devices, and sensors in an industrial process. Industrial manufacturing environments typically comprise a large number of assets, devices, and sensors and a correspondingly large number of tags available for use in the control programs. The large number of available tags makes targeting specific variables in an industrial process difficult. Moreover, industrial automation environments do not effectively or efficiently identify potentially useful tags within the control programs.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. Unfortunately, machine learning systems are not effectively or efficiently integrated into the programming systems of industrial manufacturing environments.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to surface machine learning systems in a design application of an industrial automation environment. In some examples, the system comprises a design component. The design component generates a control program configured for implementation by a Programmable Logic Controller (PLC). The design component receives a user input that selects a program tag that represents a target variable in an industrial automation process. In response to the user selection, the design component identifies one or more machine learning models associated with the target variable and displays the one or more machine learning models. The design component receives a user input that selects one of the one or more machine learning models and responsively integrates another program tag that represents the selected machine learning model into the control program.

Some embodiments comprise methods to surface machine learning systems in a design application of an industrial automation environment. The method entails generating, by a system comprising a processor, a control program configured for implementation by a Programmable Logic Controller (PLC). The method continues with receiving, by the system, a user input that selects a program tag that represents a target variable in an industrial automation process. In response to the user selection, the method continues with identifying, by the system, one or more machine learning models associated with the target variable and displays the one or more machine learning models. The method continues with receiving, by the system, a user input that selects one of the one or more machine learning models. The method continues with responsively integrating, by the system, another program tag that represents the selected machine learning model into the control program.

Some embodiments comprise a non-transitory computer-readable medium stored thereon instructions to surface machine learning systems in a design application of an industrial automation environment. The instructions, in response to execution, cause a system comprising a processor to perform operations. In some examples, the operations comprise generating a control program configured for implementation by a Programmable Logic Controller (PLC). The operations further comprise receiving a user input that selects a program tag that represents a target variable in an industrial automation process. The operations further comprise identifying, in response to the user selection, one or more machine learning models associated with the target variable. The operations further comprise displaying the one or more machine learning models. The operations further comprise receiving a user input that selects one of the one or more machine learning model. The operations further comprise integrating, in response to the user input, another program tag that represents the selected machine learning model into the control program.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
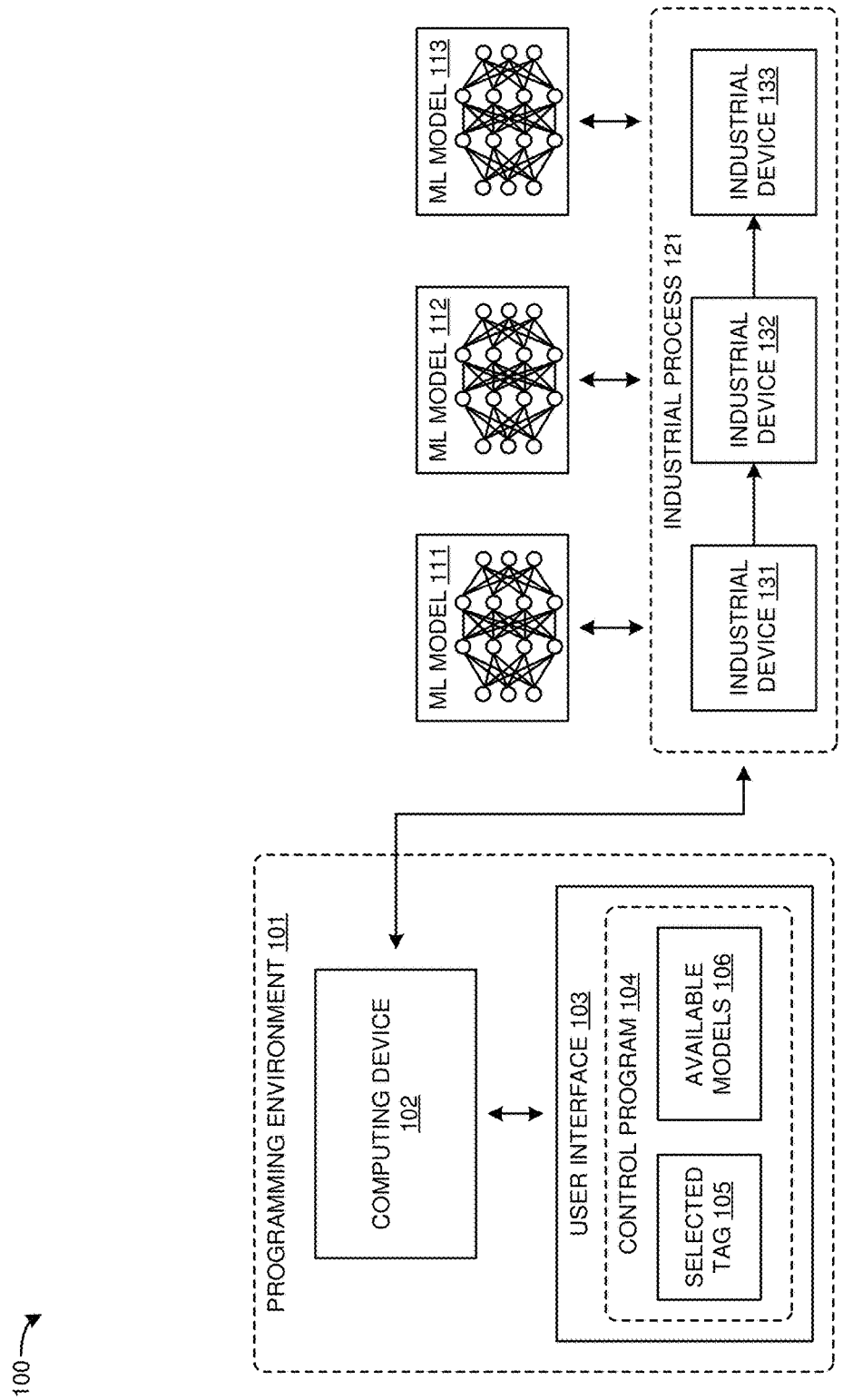
FIG. 1 illustrates an exemplary industrial automation environment to surface machine learning systems in a design application of the industrial automation environment.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods for surfacing machine learning models in programming environments for use in control programs. Generally, industrial control programs provide instructions for controlling and performing certain operations within an industrial environment via controllers like Programmable Logic Controllers (PLCs). The controllers execute the control code to control downstream devices, machinery, and automated processes.

The present technology serves to enhance industrial control by enabling the use of machine learning models within control programs for more advanced control. Industrial automation environments often fail to effectively integrate machine learning models into the design environment of industrial automation systems. In an implementation of the present technology, machine learning models may be made available to programmers in the industrial programming environment. Programming environments allow a programmer to "drag and drop" program tags that represent industrial assets into a control program. The program tags correspond to machinery in an automated process, machine settings, machine operations, and the like. The programmer can connect the tags to one another to construct a control program designed to implement an automated industrial process.

In accordance with the present disclosure, machine learning models may be connected with other elements within the industrial automation environment like design application servers in the programming environment or PLCs. In an embodiment, a programming environment may receive a user selection of a programming tag. In response, the programming environment may identify, and surface machine learning models related to the selected programming tag. For example, a tag selection may comprise a temperature sensor in an industrial automation process. The programming environment may identify a machine learning model that ingests data from the temperature sensor that is monitoring the temperature delta of a heat exchanger process as related to the selected tag. The programming environment surfaces a program tag for the identified machine learning model. The identified machine learning program tags may be integrated into an existing control program to utilize machine learning functionality in the control program.

In another example, a design application in a programming environment may generate a control program. The program may comprise a set of program tags the comprise control code configured for ingestion by a PLC. The design application may receive user input that selects a one of the program tags in the control program. The selection may indicate a command to optimize or make some type of change to the target variable represented by the selected program tag. For example, the target variable may comprise vessel pressure and the selected tag may comprise control code that monitors the vessel pressure. The design application may interface with a machine learning model and/or a data repository to identify machine learning models and data pipelines that are related to the selected program tag. The design application may present program tags represented the identified models and pipelines to a user and modify the control program using the program tags in response to user input.

In accordance with the present disclosure, a machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. In some examples, the outputs and inputs of machine learning models are used to correlate models with programming tags in a design application of a programing environment.

Machine learning models may be deployed on premises in an industrial automation environment or off-site. For example, the machine learning model may be implemented in a data science environment and have a live connection with a programming environment configured to generate control programs. Machine learning models inherently have a useful lifecycle as the environment around it changes. Over time, the models become ubiquitous and can, in essence, wear out, just like any other machine or sensor on an industrial line. Thus, the machine learning assets disclosed herein may be periodically replaced and/or retrained to maintain the integrity of machine learning outputs.

To accompany the use of control program integrated models, corresponding faceplates, displays, Graphical User Interfaces (GUIs), and the like are contemplated herein to provide intuitive representations and interfaces to for surfacing machine learning models. A GUI may comprise basic controls and/or visuals relevant to generating the control program for implementation in an industrial automation environment. In this manner, machine learning can be brought into the programming environment. For example, a programmer may interact with a GUI to perform a task such as making tag selections, reviewing machine learning model tags, integrating surfaced machine learning tags into control programs, and/or other types of interactions. The GUI may also be useful for performing tasks such as offsetting parameters, providing inputs, tuning parameters of the model, overriding the model, checking the status of the model, or instantiating new models and data pipelines.

Now referring to the Figures, FIG. 1 illustrates industrial automation environment 100 to surface machine learning systems in a design application of the industrial automation environment. Industrial automation environment 100 performs services like factory automation, factory control, machine control, smart manufacturing, machine communication and organization, and the like. Industrial automation environment 100 comprises programming environment 101, machine learning models 111-113, industrial process 121, and industrial devices 131-133. Programming environment 101 comprises computing device 102, user interface 103, and control program 104. Control program 104 comprises selected tag 105 and available models 106 displayed on user interface 103. In other examples, industrial automation environment 100 may include fewer or additional components than those illustrated in FIG. 1. Likewise, the illustrated components of industrial automation environment 100 may include fewer or additional components, assets, or connections than shown. Each of computing device 102, user interface 103, and/or machine learning models 111-113 may be representative of a single computing apparatus or multiple computing apparatuses.

Computing device 102 comprises one or more computing apparatuses configured to host an application(s) to generate control program 104, to interface with models 111-113, and to interface with industrial process 121. It should be appreciated that the specific number of applications/modules hosted by computing device 102 is not limited. Exemplary applications hosted by computing device 102 to generate control program 104 include Studio 5000® and the like. Control program 104 comprises selected tag 105 and available models 106. Control program 104 is representative of machine instructions that direct the operations of industrial process 121. Control program 104 may comprise a functional block diagram, ladder logic, or some other type of machine instructions. Computing device 102 may transfer control program 104 to industrial devices 131-133 to implement and control the industrial process 121. Selected tag 105 corresponds to a program instruction for one of industrial devices 131-133. For example, selected tag 105 may comprise instructions that direct a motor of industrial device 131-133 to start, correspond to an output variable like temperature in process 121, or represent some other type of operation, input, and/or output of process 121. In some examples, control program 104 comprises additional program tags that correspond to additional program instructions. Available models 106 comprises a display feature that indicates a set of machine learning models associated with the underlying variable represented by selected tag 105. For example, selected tag may represent output power of industrial device 131. Models 111-113 may ingest machine learning inputs associated with the output power. The design application hosted by computing device 102 may query models 111-113 to determine that they ingest machine learning inputs associated with the output power. The design application may display available models 106 which list models 111-113 along with model attributes like Identity (ID) numbers, model types, and the like.

Computing device 102 is coupled to user interface 103. User interface 103 comprises displays, keyboards, touchscreens, tablet devices, mobile user equipment, and the like. User interface 103 displays a Guided User Interface (GUI) that allows a user to interact with the application(s) hosted by computing device 102, including the design application configured to generate control program 104. A user may interact with the GUI via user interface 103 to generate control program 104. For example, a user may select, drag-and-drop, or perform some type of action via user interface 103 to construct control program 104.

Machine learning model 111-113 are representative of any machine learning models implemented within industrial automation environment 100 as described herein. Machine learning models 111-113 are configured to ingest process data generated by industrial devices 131-133 and generate machine learning outputs to affect the operation of devices 131-133 to optimize industrial process 121. For example, the outputs may comprise suggestions to optimize the operation of devices 131-133. Machine learning models 111-113 may be hosted by one or more machine learning repositories. The repositories may comprise computing systems configured to implement models 111-113. The repositories may comprise application specific processing systems purpose built for machine learning implementations. Models 111-113 may be trained using input data generated from by computing device 102, industrial devices 131-133, storage system 114, external sources, and/or some other type of training source. Models 111-113 are coupled to industrial devices 131-133 in process 121. For example, model 111 may comprise industrial ethernet communication links with devices 131-133.

Programming environment 101 is functionally coupled to industrial process 121. For example, computing device 102 may be functionally coupled to a Programmable Logic Controller (PLC) that implements control programs to control industrial process 121. Industrial process 121 is representative of a manufacturing, chemical production, food processing, or any other type of industrial process. Industrial devices 131-133 are representative of machines configured to carry out industrial process 121. Industrial devices 131-133 are representative of pumps, motors, heat exchanges, reactors, food processing systems, or any other type of industrial device. Typically, the type of machines represented by industrial devices 131-133 depend in part on the type of process that industrial process 121 is representative of. Industrial devices 131-133 receive machine instructions generated in programming environment 101 and operate in response to the instructions to implement industrial process 121. For example, industrial devices 131-133 may receive control signaling from a PLC and operate in response to the control signaling to implement industrial process 131. The control signaling drives actuators in industrial devices 131-133 that dictate the operations of industrial devices 131-133. For example, the control signaling may correspond to an actuator setting that sets a motor speed in industrial device 141 to a desired value. As industrial devices 131-133 operate in response to the control signaling, they generate process data which characterizes their operations. Industrial devices 131-133 transfer the process data that they generate to for delivery to machine learning models 111-113 to receive machine learning feedback.

Programming environment 101, models 111-113, and devices 131-133 communicate over various communication links using communication technologies like industrial ethernet, Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Computing device 102, user interface 103, machine learning model repository 112, storage system 114, and industrial devices 131-133 comprise microprocessors, software, memories, transceivers, bus circuitry, and the like. The microprocessors comprise Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of industrial automation environment 100 as described herein.

Figure 2:
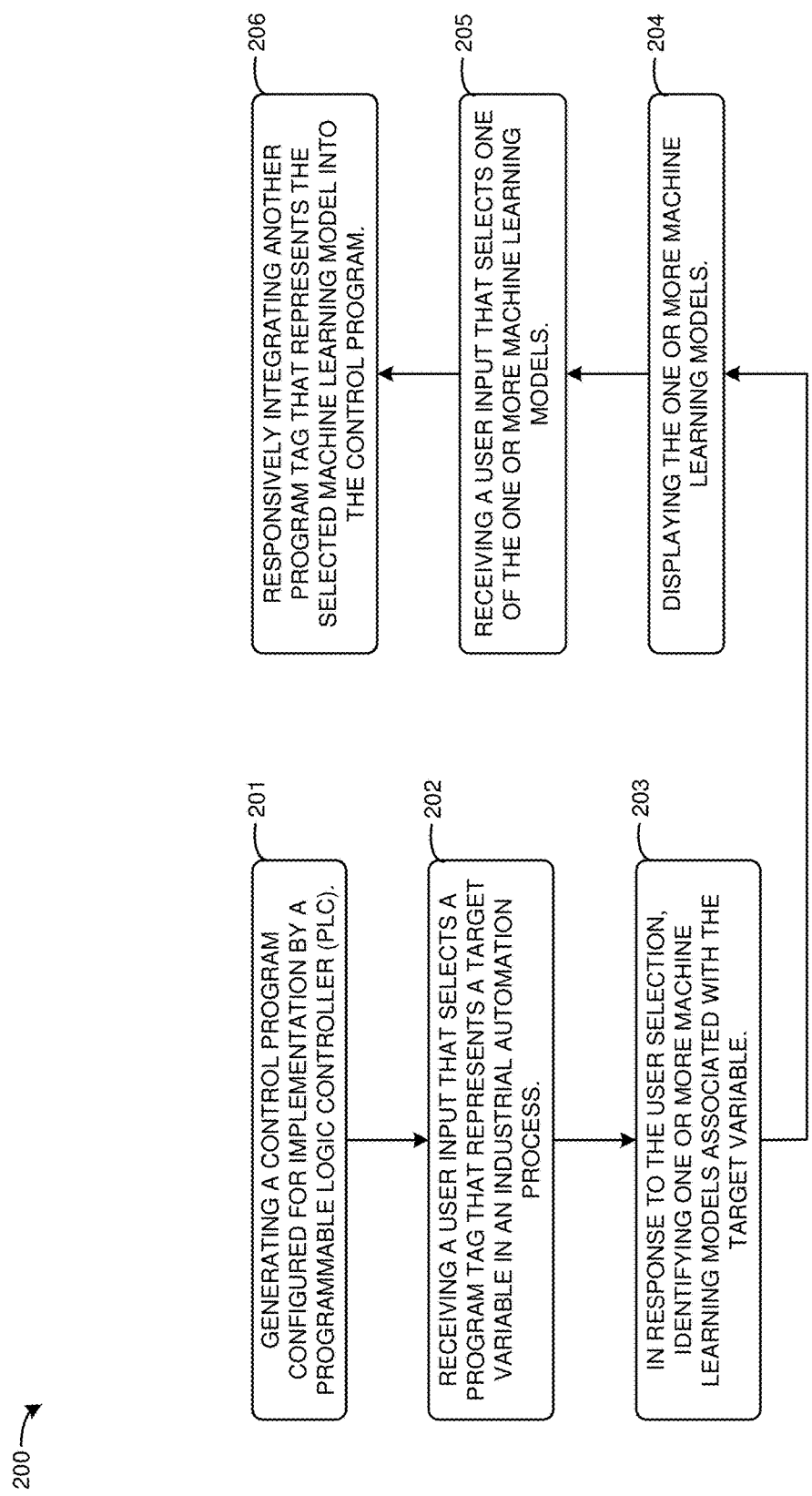
FIG. 2 illustrates an exemplary operation of an industrial automation environment to surface machine learning systems in a design application of the industrial automation environment.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a machine learning surfacing process in a design application of the industrial automation environment. Program 200 may be implemented in program instructions in the context of any of the software applications, module components, or other such elements of one or more computing devices. The program instructions direct the computing device(s) to operate as follows, referred to in the singular for the sake of clarity.

In operation, process 200 begins by generating a control program configured for implementation by a Programmable Logic Controller (PLC) (step 201). The operation continues by receiving a user input that selects a program tag that represents a target variable in an industrial automation process (step 202). The operation continues by identifying, in response to the user selection, one or more machine learning models associated with the target variable (step 203). The operation continues by displaying the one or more machine learning models (step 204). The operation continues by receiving a user input that selects one or the one or more machine learning models (step 205). The operation continues by integrating, in response to the user selection, another program tag that represents the selected machine learning model into the control program (step 206).

Referring back to FIG. 1, industrial automation environment 100 includes a brief example of process 200 as employed by one or more applications hosted programming environment 101. In operation, a design application hosted by computing device 102 generates control program 104 that is configured for implementation by a PLC (step 201). For example, the design application may receive user inputs via user interface 103 and responsively generate control program 104 based on the user inputs. The user inputs may comprise clicks, drag-and-drop actions, touch screen inputs, keyboard inputs, and the like. Control program 104 comprises a set of program tags, including selected tag 105. The program tags comprise control code that drive the operation of industrial process 121. For example, industrial process 121 may comprise a PLC. The PLC may be configured to ingest and execute control program 104 to control the operation of industrial devices 131-133. The design application receives a user input via user interface 103 that selects one of the program tags of control program 104 (step 202). The design application displays user selection as selected tag 105 on user interface 103. Selected tag 105 represents a target variable in industrial process 121. For example, selected tag 105 may represent the pressure in industrial device 132.

In response to the user selection of selected tag 105, the design application hosted by computing device 102 identifies one or more machine learning models associated with the target variable (step 203). The design application may access a data storage system stores correlations machine learning models in environment 100 with variables of industrial devices 131-133. For example, the design application may determine the target variable represented by selected tag 105. The design application may then access the data storage system and retrieve the correlations to determine ones of machine learning models 111-113 associated with the target variable. The association may comprise machine learning inputs, machine learning outputs, and the like. For example, the target variable may comprise the temperature of device 131 and machine learning model 111 may ingest machine learning inputs that represent the temperature of device 131.

After identifying the associated ones of models 111-113, the design application displays the identified machine learning models on user interface 103 as available models 106 (step 204). The design application may utilize animations, visuals, text, pictures, and the like to indicate the identified machine learning models. The display may further comprise information like model ID, model location, model type, and the like describing the identified machine learning models. For example, the design application may display information regarding indication that model 113 generates machine learning predictions for the target variable of selected tag 105.

The design application receives a user input that selects one of the identified machine learning models displayed in available models 106 on user interface 103 (step 205). For example, the design application may receive the user selection via a user generate mouse-click on user interface 103. In response to the user selection, the design application integrates a program tag representing the selected machine learning model into control program 104 (step 206). For example, the program tag may drive a PLC executing control program 104 to call the machine learning model represented by the program tag to receive machine learning feedback.

Advantageously, industrial automation environment 100 effectively surfaces machine learning model tags for use in a control program to implement an industrial process. Moreover, computing device 102 efficiently determines relationships between a selected tag in the control program and machine learning models in industrial automation environment 100.

Figure 3:
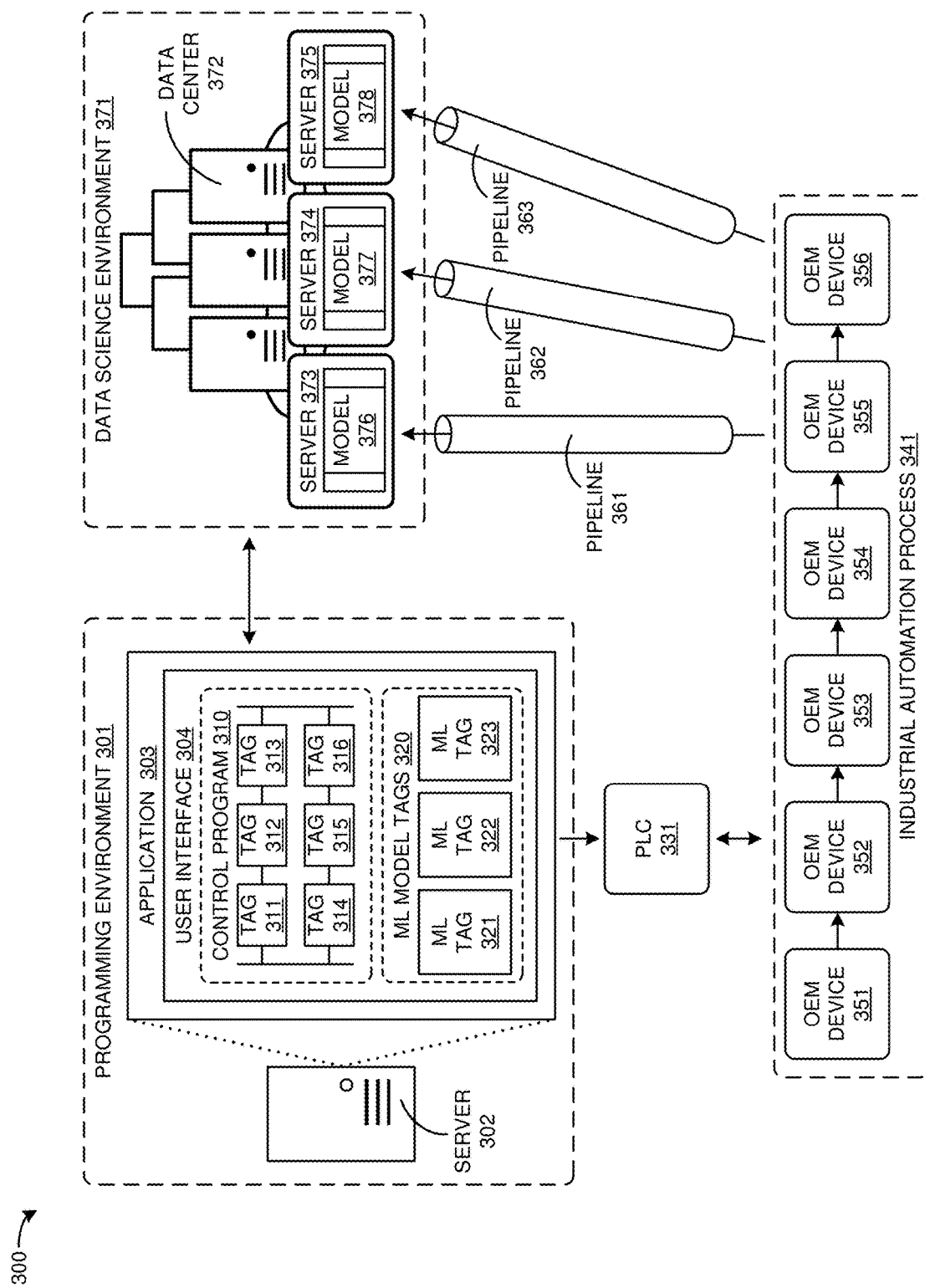
FIG. 3 illustrates an exemplary industrial automation environment to surface machine learning systems in a design application of the industrial automation environment.

FIG. 3 illustrates an industrial automation environment 300 to surface machine learning systems in a design application of the industrial automation environment. Industrial automation environment 300 comprises an example of industrial automation environment 100, however environment 100 may differ. Industrial automation environment 300 comprises programming environment 301, Programmable Logic Controller (PLC) 331, industrial automation process 341, Original Equipment Manufacture (OEM) devices 351-356, data pipelines 361-363, and data science environment 371. Programming environment 301 comprises server 302, application 303, user interface 304, control program 310, and machine learning (ML) model tags 320. Control program 310 comprise program tags 311-316 and is representative of a ladder logic diagram configured for ingestion by PLC 331. Machine learning model tags 320 comprises machine learning tags 321-323 and is representative of available machine learning program tags that may be integrated into control program 310. Data science environment 371 comprises data center 372, servers 373-375, and machine learning model 376-376.

Programming environment 301 is representative of one or more computing devices integrated into a network configured to generate control programs for industrial automation environment 300 and that communicate with data science environment 371. Programming environment 301 comprises server 302. Server 302 comprises one or more computing device configured to host application 303. The one or more computing devices that comprise server 302 comprise processors, bus circuitry, storage devices, software, and the like. The processors may comprise Central Processing Units (CPUs), Graphical Processing Units (GPUs), Application Specific Integrated Circuits (ASICs), Field Programmable Gate Arrays (FPGAs), and the like. The storage devices comprise flash drives, Random Access Memory (RAM), Hard Disk Drives (HDDs), Solid State Drives (SSDs), Non-Volatile Memory Express (NVMe) SSDs, and the like. The storage devices store the software like application 303. The processors may retrieve and execute software stored on the storage devices to drive the operation of application 303.

Application 303 is representative of one or more design applications, machine learning interface applications, user interface applications, operating systems, modules, and the like. Application 303 is configured to receive user inputs via user interface 304, generate control program 310, and surface machine learning model tags 320 based on the user inputs and/or other types of inputs. For example, application 303 may surface machine learning model tags 321-323 in response to a user selection of one of program tags 311-316.

User interface 304 is representative of a display that provides a graphical representation of application 303. The graphical representation may include one or more visual indicators relevant to control program 310 and model tags 320, such as visual indicators of visual code blocks, ladder logic, code chunks, functional block diagrams, machine learning optimizations, and/or other types of visual indictors. User interface 304 may comprise a faceplate for viewing or use by an operator or similar user within programming environment 301. User interface 304 may include a computer, a mobile device, a kiosk, a touchscreen device, a Human Machine Interface (HMI) or some other type of computing device capable of performing the user interface functions described herein. A user may interact with application 303 via user interface 304 to generate control program 310. Upon generation of control program 310, application 303 may identify machine learning tags 321-323 and present tags 321-323 on user interface 304. For example, a user may identify the variable represented by tag 314 as a target variable and select tag 314. In response, application 303 may determine machine learning tags 321-323 are associated (e.g., machine learning input/output) with the target variable and display tags 321-323 on user interface 304.

In some examples, application 303 may display other types of program tags associated with a selected target variable on user interface 304. Application 303 may display program tags for process variables in industrial automation process 341 that are related to the target variable selected by a user. For example, the target variable identified by a user may comprise a conveyer belt speed of OEM device 356 and application may display a units produced program tag on user interface 304. Application 303 may present program tags for data pipelines that communicatively connect industrial automation process 341 to machine learning models 376. For example, the target variable identified by a user may comprise a process output of OEM device 355 that is consumed as a machine learning input by model 376 and application may display a program tag representing pipeline 363.

In some examples, application 303 may present user options to generate new data pipelines and new machine learning models on user interface 304. For example, the target variable selected by a user may not be associated with any machine learning models or data pipelines. In response, user interface 304 may present selectable options on user interface 304 to instantiate new data pipelines and new machine learning models for the selected target variable. In response to a user selection to generate a new model and or new pipeline, application 303 may retrieve or generate feature vectors representing the target variable of the selected program tag. Generating feature vectors may comprise a feature extraction process that creates a numerical representation of an object (e.g., the target variable). Application 303 may train a machine learning model using the feature vectors and direct data center 372 to instantiate the new model. Once the model is trained and instantiated, application 303 may present ad integrate program tag representing the new machine learning model into control program 310.

In addition to generating new machine learning models, application 303 may instantiate new data pipelines to create data connections between the data sources for the target variable (e.g., OEM devices 351-356), and a data target for the target variable (e.g., models 376-378). For example, application 303 may determine that model 376 is related to the target variable of the program tag selected by the user and also determine that model 376 lacks a data connection with a data source for the target variable. In response, application 303 may present a user selectable option on user interface 304 to instantiate a new data pipeline between the data source and the model 376. A user may select the option on user interface 304 and application 303 may responsively instantiate a data pipeline between PLC 331 and model 376 to create the data connection.

Server 302 and is communicatively coupled to PLC 331. PLC 331 comprises one or more computing devices configured to receive and execute control code to generate control signaling for OEM devices 351-356. PLC 331 controls the automated and coordinated operation of industrial process 341. PLC 331 may implement control program that may be designed using any number of programming tools in an integrated design environment such as text-based coding, functional block diagrams, ladder logic, graphics-based programming, or other types of programming interfaces. The control program may be designed or programmed on a design computer running an integrated design environment (e.g., application 303), then transmitted or uploaded to PLC 331. Alternatively, the control program may be implemented with a system of hardware connections in the PLC or in programmable PLC modules by which a PLC can be upgraded to add more control capacity as its industrial automation process grows in sophistication.

PLC 331 controls OEM devices 351-356 by sending the control signaling over one or more data channels that support synchronous or asynchronous to implement industrial process 341. Industrial process 341 may comprises a process for manufacturing goods but may also comprise processes occurring within a utility plant (e.g., an electrical power plant), research or laboratory facility (e.g., a sample testing or processing facility), processes occurring within a food processing facility (e.g., a cattle processing plant), or any other suitable industrial automated environment. OEM devices 351-356 comprise factory or industrial machinery or manufacturing equipment such as conveyor belts or other conveyance mechanisms, robotic devices or other automated or programmable devices, packaging devices including boxing, capping, and sealing equipment, processing equipment, mixers, filling stations, quality control equipment, and other devices associated with manufacturing or other industrial processes.

PLC 331 comprises one or more computing devices. The one or more computing devices of PLC 331 comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of PLC 331.

Industrial automation process 341 is representative of a manufacturing process, chemical production process, food processing process, or any other type of industrial process. Although industrial automation process 341 is depicted with six industrial devices, in other examples automated systems may comprise a different number of industrial devices. OEM devices 351-356 may comprise devices like pumps, compressors, heat exchanges, centrifuges, mills, conveyers, filters, and the like. OEM devices 351-356 may comprise subcomponents (not illustrated for clarity) like motors, valves, electrical circuitry, processing circuitry, storage circuitry, transceivers, machined parts, and the like.

OEM devices 351-356 are coupled to PLC 331. PLC 331 transfers control signaling generated by the execution of control program 310 to OEM devices 351-356 to implement industrial automation process 341. OEM devices 351-356 receive their respective control signaling and responsively operate according to the instructions. For example, OEM device 351 may comprise an electric motor to drive a pump. PLC 331 may execute the control program (e.g., control program 310) and determine a current level to power the electric motor at to achieve a desired pressure differential in the pump. PLC 331 may transfer control signaling to the motor in OEM device 351. Actuators in the motor of OEM device 351 may receive the control signaling and apply the indicated current level to achieve the necessary power level for the electric motor to drive the motor at the speed necessary to achieve the desired pressure differential.

As OEM devices 351-356 operate based on control signaling received from PLC 331, they generate process data that characterizes their operations. The process data indicates the status of variables, operations, and/or processes of OEM devices 351-356. OEM devices 351-356 report their operational process data to PLC 331. For example, OEM 352 may comprise a ball mill and may report its rotations per minute to PLC 331 as process data.

Data pipelines 361-363 comprise data transfer systems that communicatively couple OEM devices 351-356 with data science environment 351. For example, data pipelines 361-363 may be coupled to PLC 331 to transfer process data generated by OEM devices 351-356 for delivery to machine learning models 376-378. Data pipelines 361-363 comprise a set data processing elements connected in series. The data processing elements comprise processors, bus circuitry, storage devices, software, and the like. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of data pipelines 361-363.

Data pipelines 361-363 transfer process data generated by OEM devices 351-356 for delivery to machine learning models 355-358. Data pipelines 361-363 may perform processing operations on the data prior to reception by machine learning models 376-378. For example, data pipeline 361 may receive raw process data, implement a feature extraction process on process data to generate feature vectors that represent the process data, and transfer the feature vectors to server 373 for delivery to machine learning model 356. Data pipelines 361-363 may correspond to tags within control programming environment 301. For example, data pipeline 361 may correspond to tag 311-313. In some examples, application 303 instantiates ones of data pipelines 361-363 in response to a user input via user interface 304.

Data science environment 371 comprises data center 372. Data center 372 is representative of one or more computing devices integrated into a network that communicates with programming environment 301, PLC 331, and/or OEM devices 351-356. Examples of data center 372 may include server computers and data storage devices deployed on-premises, in the cloud, in a hybrid cloud, or elsewhere, by service providers such as enterprises, organizations, individuals, and the like. Data center 372 may rely on the physical connections provided by one or more other network providers such as transit network providers, Internet backbone providers, and the like for communication purposes. Data center 372 comprises server computers 373-375 which host machine learning models 376-378 respectively.

Server computers 373-375 comprises processors, bus circuitry, storage devices, software, and the like configured to host machine learning models 376-378. The processors may comprise CPUs, GPUs, ASICs, FPGAs, and the like. The storage devices comprise flash drives, RAM, HDDs, SSDs, NVMe SSDs, and the like. The storage devices store the software. The processors may retrieve and execute software stored on the storage devices to drive the operation of machine learning models 376-378. In some examples, application 303 trains and instantiates ones of models 376-378 in response to user input received via user interface 304.

Machine learning models 376-378 comprises one or more machine learning algorithms that are trained to generate machine learning outputs (e.g., machine learning optimization predictions) to affect industrial automation process 341. Machine learning models 376-378 employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or other types of machine learning algorithms that predict output data based on input data. Determining which machine learning methods to use may depend on the specific purpose or functions required in a particular industrial setting. Machine learning models 376-378 may utilize supervised learning methods, unsupervised learning methods, and/or reinforcement learning methods to train itself. The training data may comprise feature vectors that comprise numeric representations of the training data.

Figure 4:
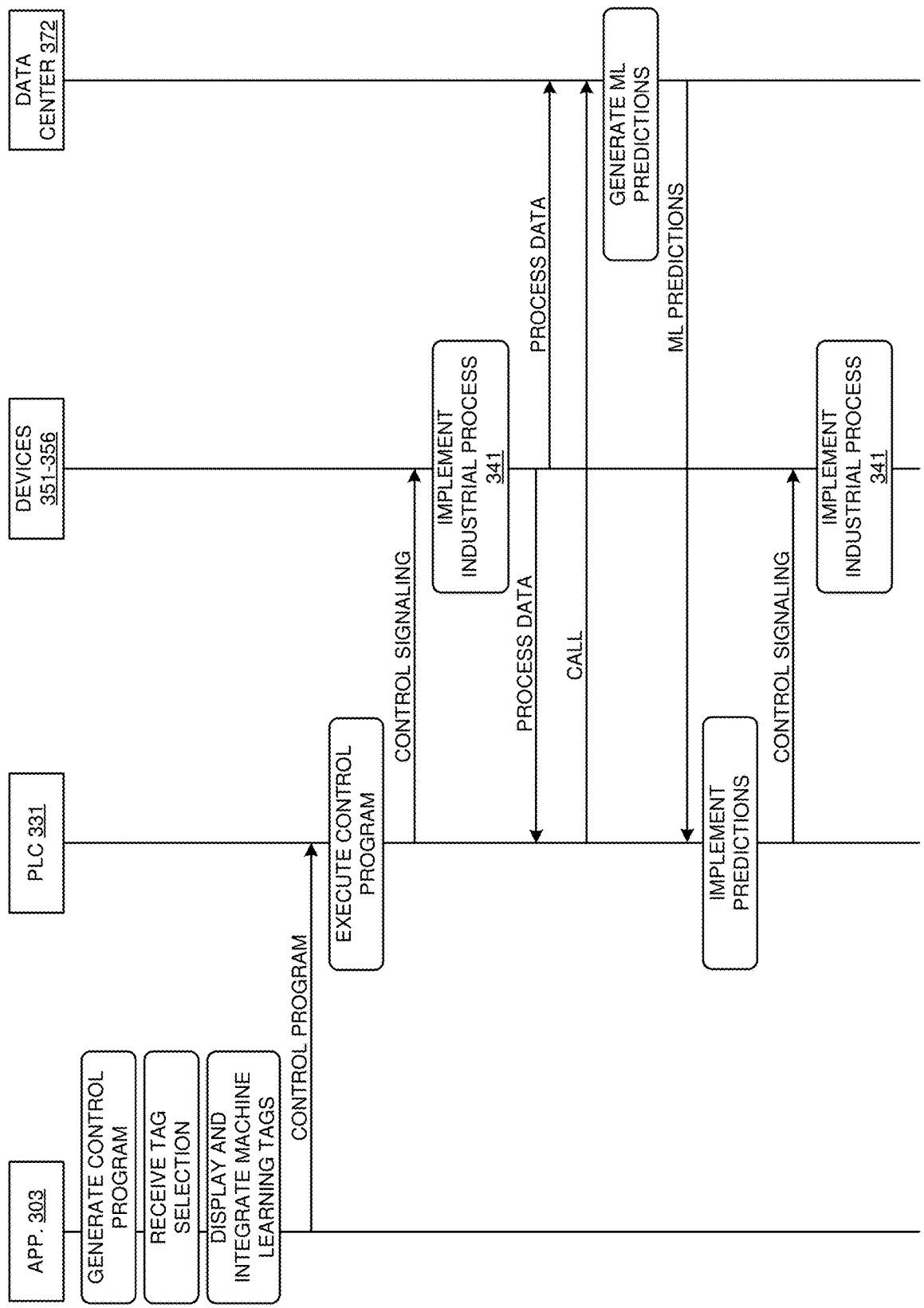
FIG. 4 illustrates an exemplary operation of an industrial automation environment to surface machine learning systems in a design application of the industrial automation environment.

FIG. 4 illustrates an exemplary operation of industrial automation environment 300 to surface machine learning systems in a design application of the industrial automation environment. The operation depicted by FIG. 4 comprises an example of process 200 illustrated in FIG. 2, however process 200 may differ. In other examples, the structure and operation of industrial automation environment 300 may be different.

In operation, application (APP.) 303 generates control program 310. Control program 310 is configured for execution by PLC 331 to drive the operation of OEM devices 351-356. Application 303 receives a user input via user interface 304 and responsively selects one of program tags 311-316 that represents a target variable in industrial automation process 341. For example, tag 315 may represent the viscosity of a substance in OEM device 351. An operator may wish to adjust the viscosity of the substance to a desired setpoint and in response, selects tag 315 via user interface 303.

In response to the tag selection, application 303 identifies a set of machine learning models in industrial automation environment 301 that are associated with the selected program tag. For example, the tag selection may represent the power output of OEM device 354. Application may query data center 372 to determine ones of machine learning models 376-378 that affect the power output of OEM device 354. The association may comprise models that ingest machine learning inputs representing the power output of OEM device 354, models that generate machine learning outputs that affect the power output of OEM device 354, and/or models that possess some other type of relationship with the power output of OEM device 354. Data center 372 responds to the query indicating ones of machine learning models 376-378 related to the target variable of the selected program tag. Alternatively, application 303 may access a local storage system in server 302 to determine correlations between the selected program tag and models 376-378. For example, application 303 may track relationships between program tags and machine learning models and store a correlation matrix on a storage device of server 302 to track the relationships.

In response to determining ones of models 376-378 that are related to the selected program tag, application 303 displays program tags that represent the identified machine learning models as available models 320. Application 303 receives a user input via user interface 304 that selects one or more of the machine learning program tags displayed in available models 320. In response to the user selection, application 303 integrates the selected machine learning program tag into control program 310.

Application 303 uploads control program 310 to PLC 331 and directs PLC 331 to implement control program 310. For example, application 303 may drive server 302 to transfer control program 310 to PLC 331 via an industrial ethernet link. PLC 331 receives control program 310 from application 303. PLC 331 executes control program 310 and transfers corresponding control signaling to OEM devices 351-356. For example, OEM device 351 may comprise a heat exchanger and tag 313 may dictate a temperature differential setting for OEM 353. PLC 331 may execute instructions of tag 313 and determine a valve setting to achieve a cold-water flow rate that results in the desired temperature differential. PLC 331 may transfer executed instructions of tag 313 to OEM device 353. In response, OEM device 353 may activate valve actuators and set the valve to the position indicated by the instructions.

OEM devices 351-356 of industrial automation process 341 receive the control signaling from PLC 331. OEM devices 351-356 implement industrial automation process 341 as dictated by the control signaling generated by the execution of control program 310. OEM devices 351-356 generate process data based on their operations and transfer the process data to PLC 331. PLC 331 transfers a call to data center 372 to receive machine learning feedback to optimize process 341. For example, control program 310 may comprise a machine learning program tag that drives PLC 331 to request machine learning feedback from model 377 regarding a process variable in industrial automation process 341. In response to executing the machine learning program tag, PLC 331 transfers the call to data center 372 for delivery to machine learning model 377.

Data center 372 receives the call and forwards the call for the intended one of machine learning models 376-378. Models 376-378 generate machine learning outputs and transfer the outputs to PLC 331. PLC 331 implements the machine learning output and transfers corresponding control signaling to OEM devices 351-356. For example, the machine learning output may comprise a machine learning prediction that OEM device 351 will fall out of a target operating range. In response, PLC 331 may receive the prediction and generate correctional signaling to keep OEM device 351 in the target operating range. OEM devices 351-356 receive and implement the control signaling.

Figure 5:
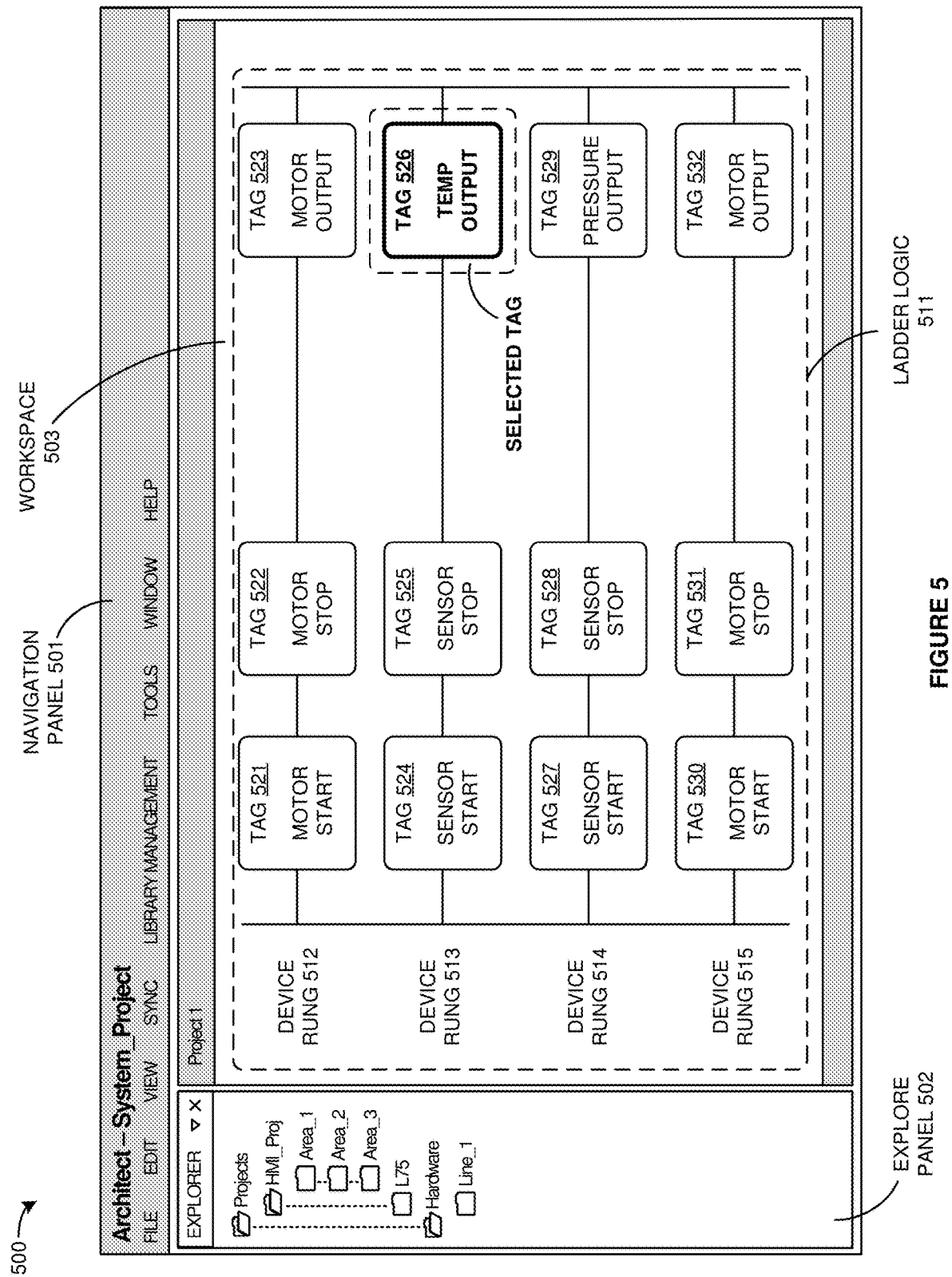
FIG. 5 illustrates an exemplary user interface in the industrial automation environment.

FIG. 5 illustrates user interface 500 to surface machine learning models. User interface 500 comprises an example of user interface 103 and user interface 304, however user interface 103 and user interface 304 may differ. User interface 500 comprises a programming environment presented on a display screen which is representative of any user interface for generating control code. For example, user interface 501 may comprise a Guided User Interface (GUI) configured to allow a user to interact with a design application to generate control program represented as a ladder logic diagram.

User interface 500 includes navigation panel 501 that allows a user to access the various features available through user interface. Navigation panel 501 comprises tabs like "FILE", "EDIT", "VIEW", "LIBRARY MANAGEMENT", "TOOLS", "WINDOW", and "HELP". In other examples, navigation panel 501 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to save a project to memory. Navigation panel 501 is located on a top portion of user interface 500 however navigation panel 501 may be located on a different portion of user interface 500. For example, navigation panel 501 may be located on the bottom portion of user interface 500.

User interface 500 incudes explore panel 502. Explore 502 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. For example, a user may select the "L75" folder to access its contents. Explore panel 502 is located on a left portion of user interface 500 however explore panel 502 may be located on a different portion of user interface 500. For example, explore panel 502 may be located on the right portion of user interface 500.

User interface 500 includes workspace 503. Workspace 503 comprises ladder logic 511. Ladder logic 511 is an example of a control program configured implementation of a Programmable Logic Controller (PLC). A user may interact with user interface 500 to construct ladder logic 511 on workspace 503. Ladder logic 511 is organized into rungs 512-515. In this example, each of rungs 512-515 comprise a set of program tags that comprise control instruction for an industrial device within an industrial automation environment. Device rung 512 comprises tags 521-523, device rung 513 comprises tags 524-526, device rung 514 comprises tags 527-529, and device rung 515 comprises tags 530-532. For example, a PLC may execute the control instructions formed by tags 521-523 of device rung 512 to control the operation of a corresponding industrial device. Each of tags 521-532 comprise control instructions that direct their corresponding industrial device to perform a specific action. For example, tag 524 comprises a sensor start command, tag 525 comprises a sensor stop command, and tag 525 comprises a sensor output command. In other examples, some or all of tags 521-532 may comprise different types of control instructions. Tag 526 comprises a "selected tag". For example, user interface 500 may receive one or more user inputs to select 526. The selection comprises a machine learning surfacing request for the variable represented by tag 526. In this example, tag 526 comprises a temperature output command and the machine learning surfacing request may wish to identify machine learning models related to the temperature output of tag 526. In response to the selection on user interface 500, a design application may identify one or more machine learning models associated with tag 526.

Figure 6:
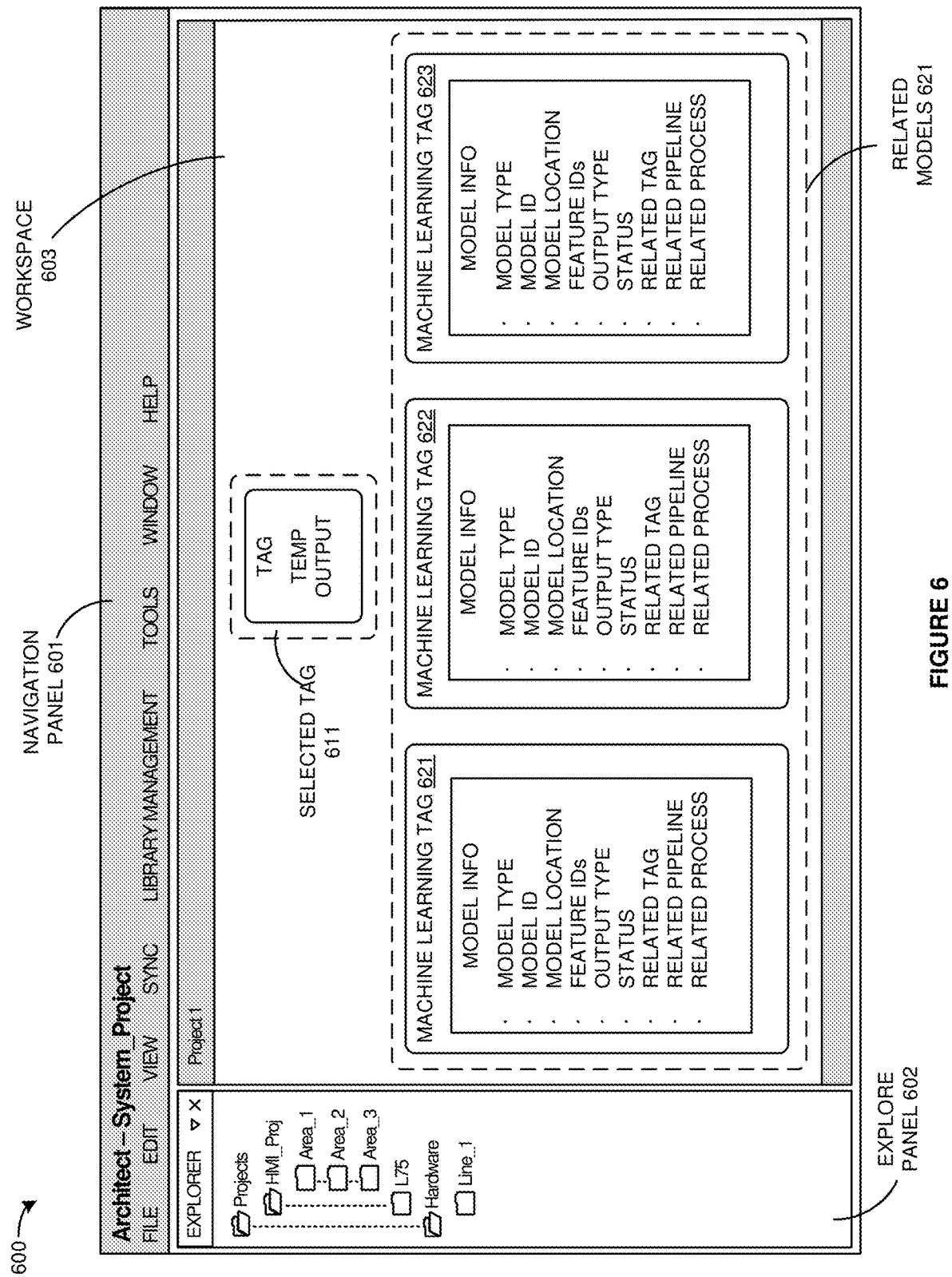
FIG. 6 illustrates an exemplary user interface in the industrial automation environment.

FIG. 6 illustrates user interface user interface 600 to surface machine learning models. User interface 600 comprises an example of user interface 103 and user interface 304, however user interface 103 and user interface 304 may differ. User interface 600 comprises a programming environment presented on a display screen which is representative of any user interface for generating control code.

User interface 600 includes navigation panel 601 that allows a user to access the various features available through user interface. Navigation panel 601 comprises tabs like "FILE", "EDIT", "VIEW", "LIBRARY MANAGEMENT", "TOOLS", "WINDOW", and "HELP". In other examples, navigation panel 601 may comprise fewer tabs, more tabs, and/or different types of tabs. A user may select a tab to access the functionality of the tab. Upon selection, the tabs may open drop down menus that list their functionality. Navigation panel 601 is located on a top portion of user interface 600 however navigation panel 601 may be located on a different portion of user interface 600.

User interface 600 incudes explore panel 602. Explore 602 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. Explore panel 602 is located on a left portion of user interface 600 however explore panel 602 may be located on a different portion of user interface 600.

User interface 600 includes workspace 603. Workspace 603 comprises selected tag 611 and related models 620. Related models comprise machine learning tags 621-623. For example, a user input may comprise selected tag 611 and user interface 600 may responsively display related models 620 which comprise machine learning models associated with the variable represented by selected tag 611. Machine learning tags 621-623 comprise model info panels that comprise information describing the machine learning models represented by tags 621-623. The model info panels comprise information like model type, model ID, model location, feature IDs, output type, status, related tag, related pipelines, and related processes. In other examples, model info panels may comprise different types of information describing the machine learning models.

Figure 7:
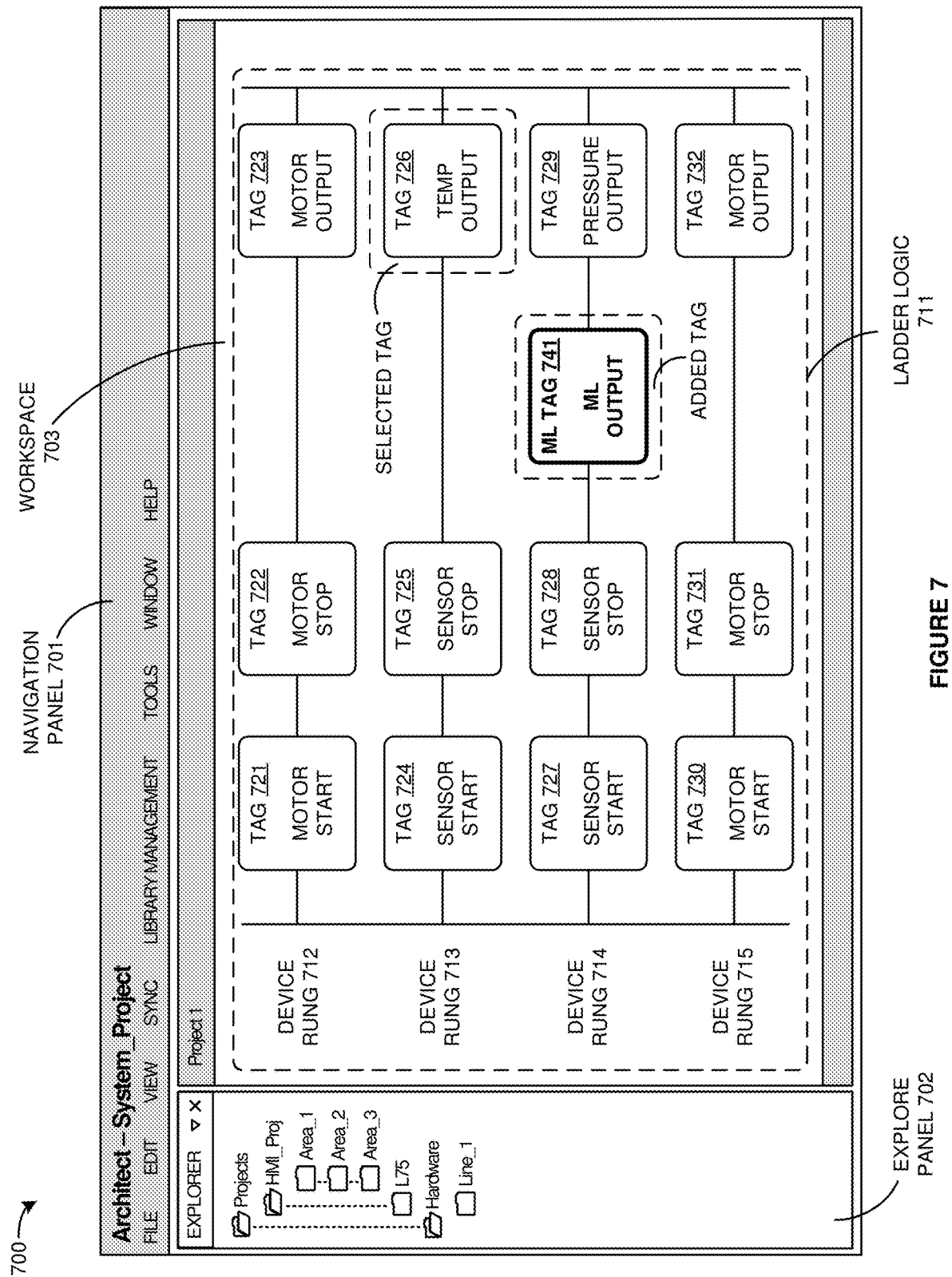
FIG. 7 illustrates an exemplary user interface in the industrial automation environment.

FIG. 7 illustrates user interface 700 to apply machine learning optimizations into an industrial process. User interface 700 comprises an example of user interface 103 and user interface 304, however user interface 103 and user interface 304 may differ. User interface 700 comprises a programming environment presented on a display screen which is representative of any user interface for generating control code. For example, user interface 701 may comprise a graphical representation on a display screen of a computing device that allows a user to interact with a design application to generate a control program formed by a ladder logic diagram.

User interface 700 includes navigation panel 701 that allows a user to access the various features available through user interface. Navigation panel 701 comprises tabs like "FILE", "EDIT", "VIEW", "LIBRARY MANAGEMENT", "TOOLS", "WINDOW", and "HELP". In other examples, navigation panel 701 may comprise fewer tabs, more tabs, and/or different types of tabs. A user may select a tab to access the functionality of the tab. Upon selection, the tabs may open drop down menus that list their functionality. Navigation panel 701 is located on a top portion of user interface 700 however navigation panel 701 may be located on a different portion of user interface 700.

User interface 700 incudes explore panel 702. Explore 702 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. Explore panel 702 is located on a left portion of user interface 700 however, explore panel 702 may be located on a different portion of user interface 700.

User interface 700 includes workspace 703. Workspace 703 comprises ladder logic 711. Ladder logic 711 is an example of a control program configured implementation of a PLC. A user may interact with user interface 700 to construct ladder logic 711 on workspace 703. Ladder logic 711 is organized into rungs 712-715. Each of rungs 712-715 comprise a set of program tags that comprise control instruction for an industrial device within an industrial automation environment. Device rung 712 comprises tags 721-723, device rung 713 comprise tags 724-726, device rung 714 comprises tags 727-729, and device rung 715 comprises tags 730-732. Each of tags 721-732 comprise control instructions that direct their corresponding industrial device to perform a specific action. In other examples, some or all of tags 721-732 may comprise different types of control instructions.

Tag 726 comprises the "selected tag" generated by a user input to optimize the target variable represented by tag 726. In response to the selection of tag 726 and a corresponding machine learning model tag, user interface 700 populates ladder logic 711 with machine learning model tag 741. Machine learning tag 741 is presented on device rung 714. Machine learning tag 741 comprises a programming tag correlated with the selected tag that was chosen by a user, which in this example comprises tag 726.

Figure 8:
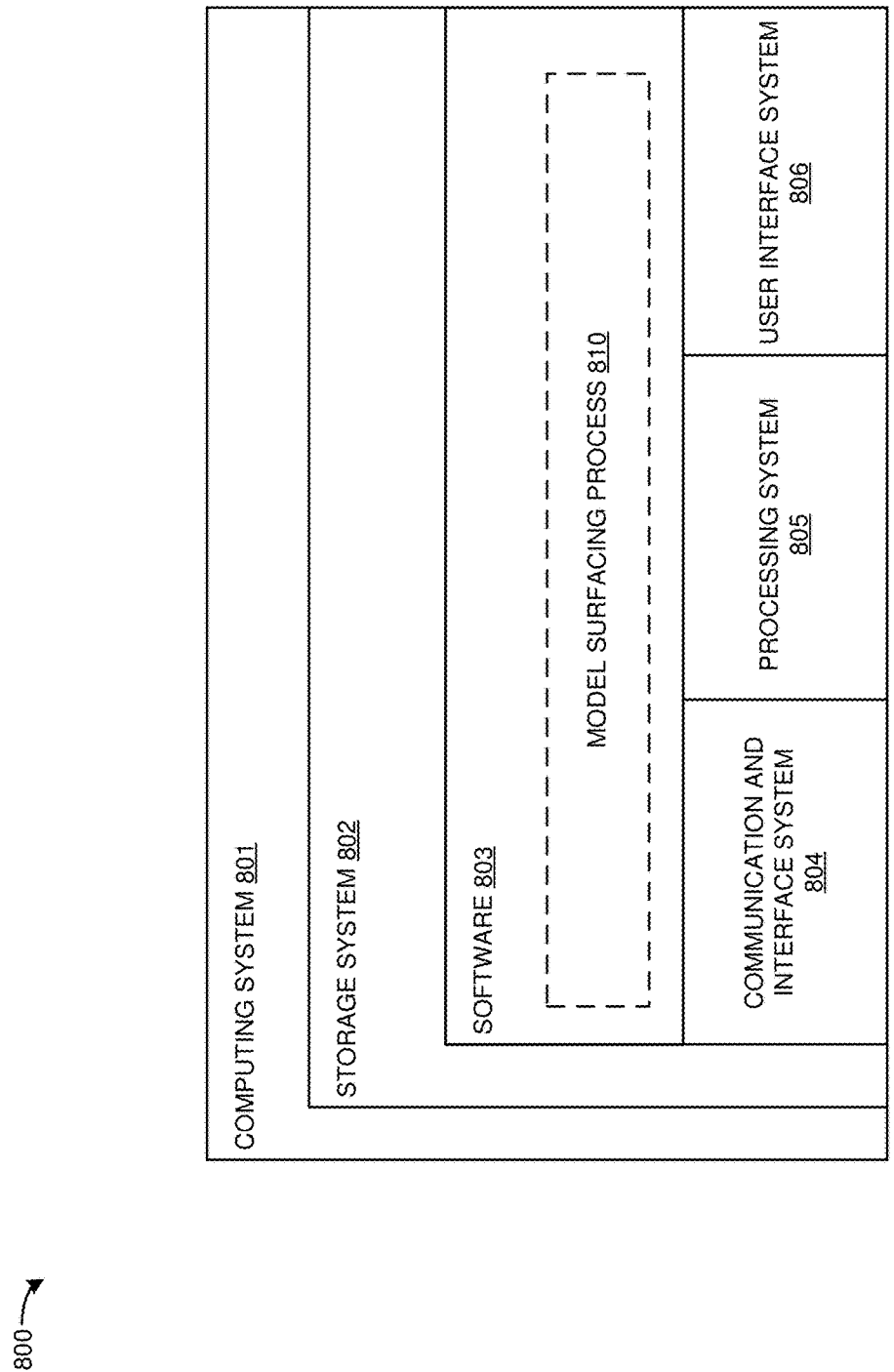
FIG. 8 illustrates an exemplary computing device that may be used in accordance with some embodiments of the present technology.

FIG. 8 illustrates computing system 801 according to an implementation of the present technology. Computing system 801 is representative of any system or collection of systems with which the various operational architectures, processes, scenarios, and sequences disclosed herein surfacing machine learning systems within industrial automation environments may be employed. For example, computing system 801 may be representative of computing device 102, server 302, PLC 331, data center 372, and/or any other computing device contemplated herein. Computing system 801 may be implemented as a single apparatus, system, or device or may be implemented in a distributed manner as multiple apparatuses, systems, or devices. Computing system 801 includes, but is not limited to, storage system 802, software 803, communication interface system 804, processing system 805, and user interface system 806. Processing system 805 is operatively coupled with storage system 802, communication interface system 804, and user interface system 806.

Processing system 805 loads and executes software 803 from storage system 802. Software 803 includes and implements model surfacing process 810, which is representative of any of the machine learning system surfacing processes discussed with respect to the preceding Figures, including but not limited to the industrial control, machine learning surfacing, and user interface operations described with respect to the preceding Figures. For example, model surfacing process 810 may be representative of process 200 illustrated in FIG. 2 and/or the exemplary operation of environment 300 illustrated in FIG. 4. When executed by processing system 805 to surface a machine learning model in an integrated design environment, software 803 directs processing system 805 to operate as described herein for at least the various processes, operational scenarios, and sequences discussed in the foregoing implementations. Computing system 801 may optionally include additional devices, features, or functionality not discussed for purposes of brevity.

Processing system 805 may comprise a micro-processor and other circuitry that retrieves and executes software 803 from storage system 802. Processing system 805 may be implemented within a single processing device but may also be distributed across multiple processing devices or sub-systems that cooperate in executing program instructions. Examples of processing system 805 include general purpose CPUs, GPUs, ASICs, FPGAs, and logic devices, as well as any other type of processing device, combinations, or variations thereof.

Storage system 802 may comprise any computer readable storage media readable by processing system 805 and capable of storing software 803. Storage system 802 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 802 may also include computer readable communication media over which at least some of software 803 may be communicated internally or externally. Storage system 802 may be implemented as a single storage device but may also be implemented across multiple storage devices or sub-systems co-located or distributed relative to each other. Storage system 802 may comprise additional elements, such as a controller, capable of communicating with processing system 805 or possibly other systems.

Software 803 (including model surfacing process 810) may be implemented in program instructions and among other functions may, when executed by processing system 805, direct processing system 805 to operate as described with respect to the various operational scenarios, sequences, and processes illustrated herein. For example, software 803 may include program instructions for receiving user input on a user interface and surfacing machine learning models based on the user input as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 803 may include additional processes, programs, or components, such as operating system software, virtualization software, or other application software. Software 803 may also comprise firmware or some other form of machine-readable processing instructions executable by processing system 805.

In general, software 803 may, when loaded into processing system 805 and executed, transform a suitable apparatus, system, or device (of which computing system 801 is representative) overall from a general-purpose computing system into a special-purpose computing system customized to surface machine learning outputs in a design environment, receive user selections via a user interface, and integrate machine learning tags into control programs as described herein. Indeed, encoding software 803 on storage system 802 may transform the physical structure of storage system 802. The specific transformation of the physical structure may depend on various factors in different implementations of this description. Examples of such factors may include, but are not limited to, the technology used to implement the storage media of storage system 802 and whether the computer-storage media are characterized as primary or secondary storage, as well as other factors.

For example, if the computer readable storage media are implemented as semiconductor-based memory, software 803 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 804 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of computing devices for machine learning model surfacing, it should be understood that the condition systems and methods described herein are not limited to such embodiments and may apply to a variety of other industrial automation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to surface machine learning systems in a design application of an industrial automation environment, the system comprising:
a memory that stores executable components; and
a processor, operatively coupled to the memory, that executes the executable components, the executable components comprising:
a design component configured to generate a control program configured for implementation by a Programmable Logic Controller (PLC) and receive a user input that selects a program tag that represents a target variable in an industrial automation process;
in response to the user selection, the design component configured to identify one or more machine learning models associated with the target variable and display the one or more machine learning models;
the design component configured to receive a user input that selects one of the one or more machine learning models and responsively integrate another program tag that represents the selected machine learning model into the control program;
the design component configured to receive another user input to generate a new machine learning model for the selected program tag;
a machine learning interface application configured to:
generate feature vectors that represent the target variable; and
train the new machine learning model based on the feature vectors; and
the design component configured to generate a new program tag that represents the new machine learning model and integrate the new program tag into the control program.

2. The system of claim 1 further comprising:
the design component configured to identify one or more input variables in the industrial automation process associated with the target variable and receive a user input that selects one of the one or more input variables; and
the design component configured to integrate an additional program tag that represents the selected input variable into the control program.

3. The system of claim 1 further comprising:
the design component configured to identify one or more data pipelines associated with the one or more machine learning models and the target variable and display the one or more data pipelines; and
the design component configured to receive a user input that selects one of the one or more data pipelines and responsively integrate another program tag that represents the selected data pipeline into the control program.

4. The system of claim 1 further comprising:
the design component configured to receive a user input to generate a new data pipeline for the selected program tag and the other program tag that represents the selected machine learning model;
a machine learning interface component configured to generate the new data pipeline between a data source associated with the target variable represented by the data pipeline and the selected machine learning model; and
the design component configured to generate a new program tag that represents the new data pipeline and integrate the new program tag into the control program.

5. The system of claim 1 further comprising:
a user interface component configured to receive the user input that selects the program tag that represents target variable, display the one or more machine learning models, and receive the user input that selects the one of the one or more machine learning models.

6. The system of claim 1 further comprising:
the design component configured to transfer the control program for delivery to the PLC wherein the PLC executes the control to implement the industrial automation process.

7. The system of claim 1, wherein the industrial automation process comprises one or more of a manufacturing process, a chemical production process, or a food processing process.

8. A method to surface machine learning systems in a design application of an industrial automation environment, the method comprising:
generating, by a system comprising a processor, a control program configured for implementation by a Programmable Logic Controller (PLC);
receiving, by the system, a user input that selects a program tag that represents a target variable in an industrial automation process;
in response to the user selection, identifying, by the system, one or more machine learning models associated with the target variable;
displaying, by the system, the one or more machine learning models;
receiving, by the system, a user input that selects one of the one or more machine learning model;
responsively integrating, by the system, another program tag that represents the selected machine learning model into the control program;
receiving, by the system, a user input to generate a new machine learning model for the selected program tag;
generating, by the system, feature vectors that represent the target variable;
training, by the system, the new machine learning model based on the feature vectors;
generating, by the system, a new program tag that represents the new machine learning model; and
integrating, by the system, the new program tag into the control program.

9. The method of claim 8 further comprising:
identifying, by the system, one or more input variables in the industrial automation process associated with the target variable;
receiving, by the system, a user input that selects one of the one or more input variables; and
integrating, by the system, an additional program tag that represents the selected input variable into the control program.

10. The method of claim 8 further comprising:
identifying, by the system, one or more data pipelines associated with the one or more machine learning models and the target variable;
displaying, by the system, the one or more data pipelines;
receiving, by the system, a user input that selects one of the one or more data pipelines; and responsively integrating, by the system, another program tag that represents the selected data pipeline into the control program.

11. The method of claim 8 further comprising:
receiving, by the system, a user input to generate a new data pipeline for the selected program tag and the other program tag that represents the selected machine learning model;
generating, by the system, the new data pipeline between a data source associated with the target variable represented by the data pipeline and the selected machine learning model;
generating, by the system, a new program tag that represents the new data pipeline; and
integrating, by the system, the new program tag into the control program.

12. The method of claim 8 wherein:
receiving, by the system, the user inputs that selects the program tag and that selects the one of the one or more machine learning models and displaying the one or more machine learning models comprises receiving the user inputs via a user interface and displaying the one or more machine learning models on the user interface.

13. The method of claim 8 further comprising:
transferring, by the system, the control program for delivery to the PLC wherein the PLC executes the control to implement the industrial automation process.

14. The method of claim 8, wherein the industrial automation process comprises one or more of a manufacturing process, a chemical production process, or a food processing process.

15. A non-transitory computer-readable medium stored thereon instructions to surface machine learning systems in a design application of an industrial automation environment that, in response to execution, cause a system comprising a processor to perform operations, the operations comprising:
generating a control program configured for implementation by a Programmable Logic Controller (PLC);
receiving a user input that selects a program tag that represents a target variable in an industrial automation process;
in response to the user selection, identifying one or more machine learning models associated with the target variable;
displaying the one or more machine learning models;
receiving a user input that selects one of the one or more machine learning model;
responsively integrating another program tag that represents the selected machine learning model into the control program;
receiving a user input to generate a new machine learning model for the selected program tag;
generating feature vectors that represent the target variable;
training the new machine learning model based on the feature vectors;
generating a new program tag that represents the new machine learning model; and
integrating the new program tag into the control program.

16. The non-transitory computer-readable medium of claim 15, the operations further comprising:
identifying one or more input variables in the industrial automation process associated with the target variable;
receiving a user input that selects one of the one or more input variables; and
integrating an additional program tag that represents the selected input variable into the control program.

17. The non-transitory computer-readable medium of claim 15, the operations further comprising:
identifying one or more data pipelines associated with the one or more machine learning models and the target variable;
displaying the one or more data pipelines;
receiving a user input that selects one of the one or more data pipelines; and
responsively integrating another program tag that represents the selected data pipeline into the control program.

18. The non-transitory computer-readable medium of claim 15, the operations further comprising:
receiving a user input to generate a new data pipeline for the selected program tag and the other program tag that represents the selected machine learning model;
generating the new data pipeline between a data source associated with the target variable represented by the data pipeline and the selected machine learning model;
generating a new program tag that represents the new data pipeline; and
integrating the new program tag into the control program.

19. The non-transitory computer-readable medium of claim 15, the operations further comprising:
transferring the control program for delivery to the PLC wherein the PLC executes the control to implement the industrial automation process.

20. The non-transitory computer-readable medium of claim 15, wherein the industrial automation process comprises one or more of a manufacturing process, a chemical production process, or a food processing process.

* * * * *